United States Patent [19]

Feldman

[11] Patent Number: 5,629,071
[45] Date of Patent: May 13, 1997

[54] CONVERTABLE BEACH TOWEL

[75] Inventor: Yair Feldman, Metairie, La.

[73] Assignee: Big E-Z Investments, Metairie, La.

[21] Appl. No.: 394,398

[22] Filed: Feb. 24, 1995

[51] Int. Cl.⁶ .................................................. B32B 9/00
[52] U.S. Cl. ...................... 428/192; 428/81; 428/82; 428/101; 428/102; 428/105; 428/126; 428/193; 383/4; 5/490; 5/419; 5/417; 5/485
[58] Field of Search .................. 428/81, 82, 100, 428/101, 102, 105, 113, 126, 192, 193, 284, 288; 5/490, 419, 417, 485; 383/4

[56] References Cited

U.S. PATENT DOCUMENTS

| | | | |
|---|---|---|---|
| 4,273,380 | 6/1981 | Silvestri | 297/191 |
| 4,815,154 | 3/1989 | Grimes | 5/441 |
| 4,980,935 | 1/1991 | Kazanowski et al. | 5/419 |
| 4,991,245 | 2/1991 | Franco | 5/419 |
| 5,072,467 | 12/1991 | Hunt | 5/417 |
| 5,119,120 | 6/1992 | Holmes | 5/419 |
| 5,345,627 | 9/1994 | Cammarata | 5/419 |
| 5,346,308 | 9/1994 | Buhot et al. | 383/4 |
| 5,361,435 | 11/1994 | Reeves | 5/419 |
| 5,390,381 | 2/1995 | LaMantia | 5/417 |

Primary Examiner—Patrick Ryan
Assistant Examiner—Abraham Bahta
Attorney, Agent, or Firm—Keaty & Keaty

[57] ABSTRACT

The invention relates to a beach towel which can be converted into a bag for carrying various accessories. The towel is formed by an elongated sheet, to an upper central part of which a pillow assembly is secured. A pocket is formed between the flexible sheet and the pillow assembly to retain a folded towel after the pocket has been turned inside out. Secured between the elongated sheet and the pillow assembly are a pair of handles which become exposed on the outside after the pocket has been turned inside out.

8 Claims, 1 Drawing Sheet

U.S. Patent  May 13, 1997  5,629,071
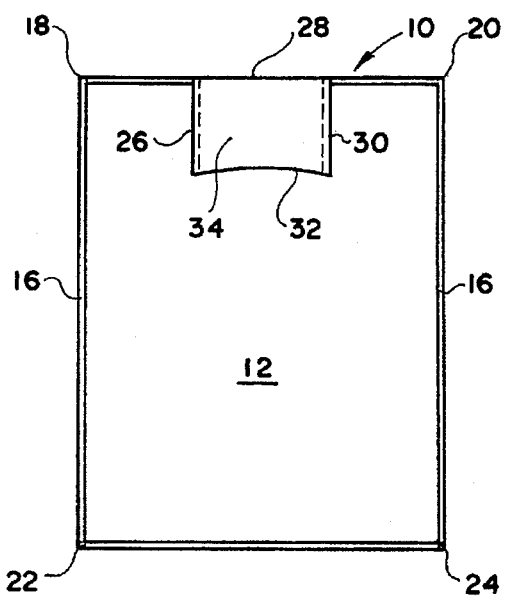
FIG. 1
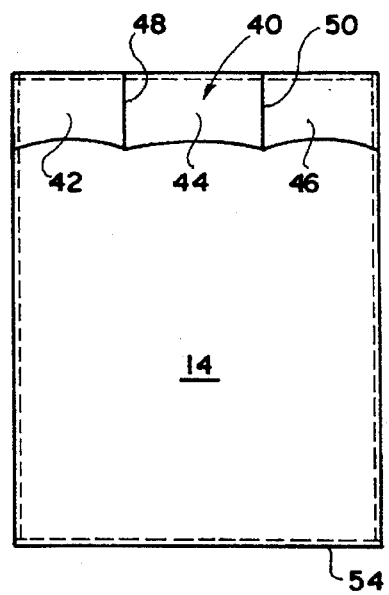
FIG. 2
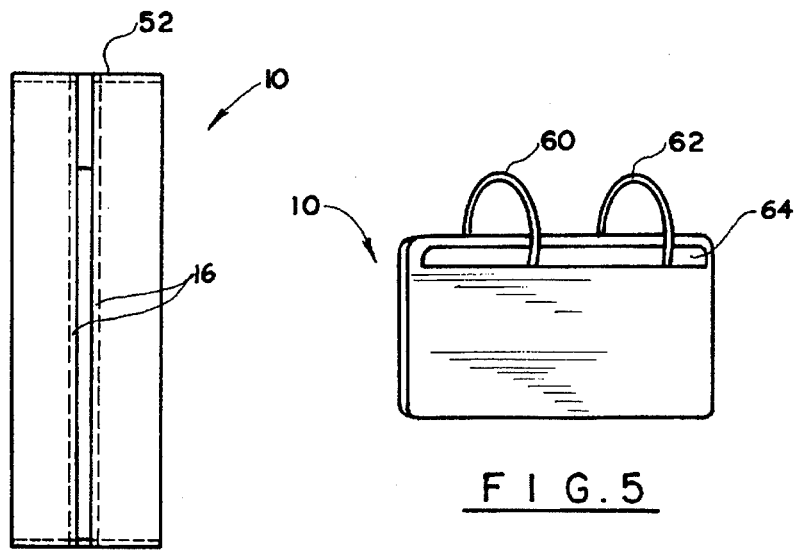
FIG. 3
FIG. 5
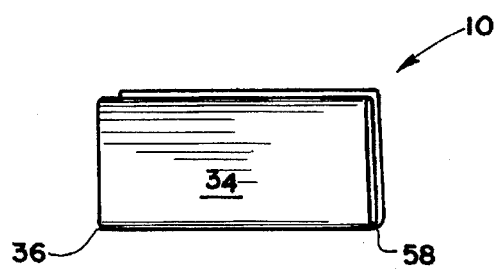
FIG. 4

CONVERTABLE BEACH TOWEL

BACKGROUND OF THE INVENTION

This invention relates to beach accessories, and more particularly to a towel which, when folded, forms a bag convenient for carrying accessory items.

Various decorated beach towels are produced by domestic and foreign manufacturers. These towels are larger in size than usual domestic towels to allow a person to spread the towel on the beach or by a pool and lie on the towel instead of sand or stone. Such beach towels are carried as a separate item to the pool or beach area along with various suntanning accessories, such as lotion and sunglasses, burdening the user due to their bulk. Additional disadvantage of conventional beach towels is the tendency of a towel to slip from the back of a lounge chair if the towel is placed over the lounge chair for additional comfort of the user.

The present invention contemplates elimination of drawbacks associated with the prior art and provision of a beach towel convertible to a bag for carrying secondary accessories.

SUMMARY OF THE INVENTION

It is, therefore, an object of the present invention to provide a towel which can be converted to a bag for carrying small items.

It is another object of the present invention to provide a beach towel which can be securely positioned on a lounge chair and which does not slide down from the back of the chair.

It is a further object of the present invention to provide a towel which has a built-in support for the user's head.

It is a further object of the present invention to provide a beach towel which is easy to fold/unfold and inexpensive to manufacture.

These and other object of the present invention are achieved through a provision of a convertible beach towel which comprises an elongated flexible sheet with a pillow assembly attached to an upper front portion. The pillow assembly is formed by an inner portion, an outer portion and a layer of fibrous material between the inner portion and the outer portion. The pillow assembly and the elongated sheet form an open-ended pocket which is adapted to retain the elongated sheet after the towel has been folded and the pockets turned inside out. A pair of handles secured between the elongated sheet and the pillow assembly become exposed to the outside after the pocket has been turned inside out.

A transverse strip of flexible material is attached to the back surface of the elongated sheet to form a flap which can be slipped over a top of a lounge chair to prevent slipping of the towel positioned on the chair. The transverse strip is divided into a plurality of pockets for retaining various accessories when the towel is spread on a horizontal surface.

BRIEF DESCRIPTION OF THE DRAWINGS

Reference will now be made to the drawings, wherein like parts are designated by like numerals, and wherein FIG. 1 is a top view of a beach towel in its unfolded condition.

FIG. 2 is a back view of the towel shown in FIG. 1.

FIG. 3 is a top view of the towel in a semi-folded condition.

FIG. 4 is a perspective view of the towel which has been folded to form a bag; and FIG. 5 is a perspective view of the beach towel converted to a bag with the handles extended.

DETAIL DESCRIPTION OF THE PREFERRED EMBODIMENT

Turning now to the drawing in more detail, the towel in accordance with the present invention is generally designated by numeral 10. As can be seen in the drawings, the towel 10 comprises a generally rectangular sheet, made from conventional material, for example, terrycloth, and defining a front surface 12 and a back surface 14. Secured about the periphery of the front surface 12 is a decorative border material 16 which finishes the loose edges of the towel to produce a more aesthetic view. Four (4) small weights (not shown) are sewn into "pockets" made by the corners 18, 20, 22 and 24 of the border material 16. The weights prevent the edges of the towel from being lifted by wind when placed on the beach or by the pool in an unfolded position.

Secured along three sides 26, 28, and 30 to the front surface 12 of the towel 10 is a pillow assembly 34 which forms a convenient resting area for the head of the user. The pillow assembly 34 is formed by an inner and outer portion of flexible material between which a layer of fibrous loose material is positioned. The inner and outer portions are sewn together along the sides 26, 28, 30 and 32, after which the pillow assembly is attached to the front surface 12 by additional stitching extending through the sides 26, 28, and 30. The side 32 is not stitched to the front surface 12, allowing a pocket to be formed between the inner portion (not shown) of the pillow 34 and the front surface 12 of the towel 10.

The back surface 14 of the towel 10 carries an elongated transverse strip 40 of material similar to the material from which the rest of the towel 10 is manufactured. The strip 40 is divided into three sections, first section 42, second section 44 and third section 46. The first section 42 is separated from the second section 44 by a suitable stitching along the line 48, while the second section 44 is separated from the third section 46 by suitable stitching made along the line 50. As a result, three pockets made from sections 42, 44 and 46 and the back surface 14. The pockets are closed on three sides, having a common closed side on the top 52 of the towel 10. The fourth side of the sections 42, 44 and 46 is open to allow formation of open-ended pockets thereby.

When the towel 10 is spread out on a horizontal surface, for example on a beach or by a poolside, the back surface 14 of the towel 10 contacts the surface on which the towel is positioned. As a result, the pockets 42, 44 and 46 are hidden from view. The user may desire to place various small items, such as suntan lotion, and the like, into the pockets 42 and 46 without any discomfort, since the pillow assembly 34 occupies a central portion on the front surface 12 of the towel 10 which corresponds to the section 44 of the back surface 14..

When the towel 10 is placed on a lounge chair, the pocket 44, being larger in size than the pockets 42 and 46, can serve as a slip pocket for positioning over the back of a lounge chair to thereby retain the towel on the chair without slipping.

When not in use, the towel 10 can be folded in the following manner. First the towel is turned in such a manner that the back surface 14 faces the user. Then the towel is folded along the stitching lines 48 and 50 from the top 52 of the towel 10 to the bottom 54 thereof. The longitudinally folded towel will then present a view similar to that shown in FIG. 3. The pillow assembly 34 will appear on the side facing away from the user. The user then grasps the bottom 54 of the towel 10 and folds it up, towards the top 52 until a rectangle is formed, with the pillow 34 forming one side of the rectangle, as shown in FIG. 4.

Then, holding the towel at bottom corners 56 and 58, the user turns the pocket of the pillow assembly inside out, forcing the inner surface of the pillow assembly 34 to form the outside of the bag, and a portion of the front surface 12 of the towel 10 to form the opposite side of the bag. Once the towel is turned inside out, a pair of handles 60 and 62 become exposed. These handles are sewn to the inner portion of the pillow assembly 34 and are not seen when the towel is spread out as in FIGS. 1 or 2. However, once the user turns the pillow assembly inside out, the handles 60 and 62 become exposed and can serve as handles of a formed bag to facilitate in carrying of small items in the cavity 64 defined by the folded towel 10.

If desired, the surface of the towel 10 can be decorated with various prints, applique, and the like. The material from which the towel is manufactured can be selected from a wide variety of conventional materials suitable for the purpose of presenting a smooth, soft surface for the user to lie down. The fibrous material used in the pillow assembly 34 is preferably selected from a group of materials which are easily cleanable and which will not disintegrate during washing of the towel. The size of the towel can obviously vary, so as to accommodate different users.

Many changes and modifications can be made in the design of the present invention without departing from the spirit thereof. I, therefore, pray that my rights to the present invention be limited only by the scope of the appended claims.

I claim:

1. A beach towel, comprising:

an elongated sheet formed from a flexible material, said sheet having a front surface and a back surface;

a pillow assembly carried by an upper part of the front surface, said pillow assembly having one side unsecured to the front surface to allow turning of the sheet inside out and forming a bag for carrying accessories; and a means carried by the back surface for securely engaging an upper part of said sheet on a back of a chair to prevent slipping of the towel positioned on the chair, said means comprising a transverse strip of flexible material attached to the back surface, said strip forming at least one pocket which is adapted for positioning over the back of the chair.

2. The towel of claim 1, wherein said strip is divided into a plurality of separate sections, each of said sections defining an open-ended pocket.

3. The towel of claim 1, wherein said pillow assembly comprises an inner wall, an outer wall secured to the front surface and a layer of fibrous material retained between the inner wall and the outer wall.

4. The towel of claim 3, wherein said inner wall carries a handle means for carrying the towel after the sheet has been turned inside out to form a bag.

5. A beach towel, comprising:

an elongated sheet formed from a flexible material, said sheet having a front surface, a back surface and an upper part;

a pillow assembly carried by an upper part of the front surface; said pillow assembly comprising an inner wall, an outer wall and a layer of fibrous material retained between the inner wall and the outer wall, said pillow assembly defining an open-ended pocket for retaining a folded towel after the pocket has been turned inside out; and a transverse strip of flexible material attached to the back surface of said sheet, said strip forming at least one pocket which is adapted for positioning on a back of a chair for securely engaging the upper part of the sheet on the back of the chair to prevent slipping of the towel positioned on the chair.

6. The towel of claim 5, wherein said strip is divided into a plurality of separate sections, each of said sections defining an open-ended pocket.

7. The towel of claim 5, wherein a pair of handles are secured between the front surface of the sheet and the inner wall of the pillow assembly, said handles facilitating carrying of the towel after the pocket has been turned inside out to form a bag.

8. A method of converting a towel into a bag, comprising the steps of:

providing a first elongated flexible sheet having a front surface, a back surface, a top part and a lower part;

providing a second flexible sheet secured to the top part of the first sheet and forming an open ended pocket with said first sheet;

providing a pair of handles secured between said first sheet and said second sheet;

folding said first sheet from the lower part towards said top part; and turning the pocket inside out while positioning the folded first sheet within the pocket, thereby forming a bag and exposing said pair of handles to facilitate carrying of the bag.

* * * * *